(12) United States Patent
Ito et al.

(10) Patent No.: US 10,202,930 B2
(45) Date of Patent: *Feb. 12, 2019

(54) INTERNAL COMBUSTION ENGINE

(71) Applicant: TOYOTA JIDOSHA KABUSHIKI KAISHA, Toyota-shi, Aichi-ken (JP)

(72) Inventors: Hisaki Ito, Gotenba (JP); Noriyuki Takada, Susono (JP); Tsutomu Kawae, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/617,173

(22) Filed: Jun. 8, 2017

(65) Prior Publication Data

US 2017/0356383 A1    Dec. 14, 2017

(30) Foreign Application Priority Data

Jun. 8, 2016    (JP) .................................. 2016-114428

(51) Int. Cl.
    *F02D 41/40*    (2006.01)
    *F02B 1/12*    (2006.01)
    (Continued)

(52) U.S. Cl.
    CPC .............. *F02D 41/402* (2013.01); *F02B 1/12* (2013.01); *F02B 23/0648* (2013.01);
    (Continued)

(58) Field of Classification Search
    CPC ........ F02B 1/12; F02B 23/06; F02B 23/0648; F02B 23/0669; F02B 23/0672;
    (Continued)

(56) References Cited

U.S. PATENT DOCUMENTS 6,616,070 B1* 9/2003 Kunkulagunta ..... F02M 45/086
                                                    239/533.11
6,758,407 B1* 7/2004 Lambert .............. F02M 45/086
                                                    123/294
(Continued)

FOREIGN PATENT DOCUMENTS

EP    1 645 749 A1    4/2006
JP    S59147864 A    8/1984
(Continued)

OTHER PUBLICATIONS

Office Action issued in U.S. Appl. No. 15/617,145 dated May 7, 2018.

(Continued)

*Primary Examiner* — John Kwon
*Assistant Examiner* — Johnny H Hoang
(74) *Attorney, Agent, or Firm* — Finnegan, Henderson, Farabow, Garrett & Dunner, LLP (57) ABSTRACT

A fuel injection valve has first injection holes, second injection holes, a first needle that opens and closes the first injection holes, and a second needle. The fuel injection valve is arranged such that a part of fuel injected from the first injection hole and a part of fuel injected from the second injection hole are gathered together at a position spaced from the side wall of the cavity by a predetermined distance. The second needle starts operating to open the second injection holes, after a predetermined time elapses from a point in time at which the first needle starts operating to open the first injection holes.

4 Claims, 7 Drawing Sheets

(51) Int. Cl.
*F02M 61/04* (2006.01)
*F02M 61/10* (2006.01)
*F02F 3/26* (2006.01)
*F02M 45/08* (2006.01)
*F02B 23/06* (2006.01)
*F02M 63/00* (2006.01)
*F02M 61/18* (2006.01)
*F02D 41/38* (2006.01)

(52) U.S. Cl.
CPC .......... *F02B 23/0669* (2013.01); *F02F 3/26* (2013.01); *F02M 45/086* (2013.01); *F02M 61/045* (2013.01); *F02M 61/10* (2013.01); *F02M 61/182* (2013.01); *F02M 61/1813* (2013.01); *F02M 63/0064* (2013.01); *F02B 23/0672* (2013.01); *F02B 23/0696* (2013.01); *F02D 2041/389* (2013.01); *F02M 2200/46* (2013.01); *Y02T 10/44* (2013.01)

(58) Field of Classification Search
CPC .. F02B 23/0696; F02D 41/402; F02D 41/405; F02D 2041/389; F02M 61/18; F02M 61/1813; F02M 61/182; F02M 61/10; F02M 61/045; Y02T 10/44
USPC .......... 123/294–299, 445, 490; 701/102–105
See application file for complete search history.

(56) References Cited

U.S. PATENT DOCUMENTS

| | | | | |
|---|---|---|---|---|
| 7,309,029 B2 * | 12/2007 | Boecking | ............ | F02M 45/086 123/304 |
| 7,523,875 B2 * | 4/2009 | Cooke | ................. | F02M 45/086 239/44 |
| 9,562,505 B2 * | 2/2017 | Hokkanen | ............ | F02M 63/029 |
| 2002/0000483 A1 * | 1/2002 | Shoji | .................... | F02B 23/0669 239/533.2 |
| 2003/0217732 A1 * | 11/2003 | Kataoka | .................... | F02B 1/12 123/276 |
| 2008/0053408 A1 | 3/2008 | Futonagane et al. | | |
| 2009/0045269 A1 * | 2/2009 | Shimo | ................. | F02M 45/086 239/585.5 |
| 2012/0323468 A1 | 12/2012 | Miyaura et al. | | |
| 2017/0356384 A1 * | 12/2017 | Ito | ........................ | F02M 61/182 |

FOREIGN PATENT DOCUMENTS

| | | |
|---|---|---|
| JP | 61-218772 A | 9/1986 |
| JP | 8-254123 | 10/1996 |
| JP | 09-236067 A | 9/1997 |
| JP | 2000-64928 | 3/2000 |
| JP | 2004-68726 | 3/2004 |
| JP | 2006-274841 A | 10/2006 |
| JP | 2007-231852 A | 9/2007 |
| JP | 2010-223166 A | 10/2010 |
| JP | 2011-190725 A | 9/2011 |
| JP | 2013-024197 A | 2/2013 |
| JP | 2013-204455 | 10/2013 |
| JP | 2014-194158 | 10/2014 |
| WO | WO 2006/104232 A2 | 10/2006 |

OTHER PUBLICATIONS

Notice of Allowance issued in U.S. Appl. No. 15/617,145 dated Oct. 10, 2018.

* cited by examiner

INTERNAL COMBUSTION ENGINE

INCORPORATION BY REFERENCE

The disclosure of Japanese Patent Application No. 2016-114428 filed on Jun. 8, 2016 including the specification, drawings and abstract is incorporated herein by reference in its entirety.

BACKGROUND

1. Technical Field

The disclosure relates to an internal combustion engine.

2. Description of Related Art

In connection with a fuel injection valve in which an upper set of injection holes and a lower set of injection holes are arranged, a technology of promoting atomization of fuel, by intersecting the central axis of one of the upper injection holes with the center axis of a corresponding one of the lower injection holes at a position relatively close to the fuel injection valve, is known (see, for example, Japanese Patent Application Publication No. 2000-064928 A (JP 2000-064928 A)).

SUMMARY

If fuel sprays intersect with each other at the position relatively close to the fuel injection valve, streams of fuel injected from the respective injection holes may be combined together, and the particle size of the fuel may be increased. Also, since the fuel is injected from around the central axis of the combustion chamber, and the fuel sprays intersect with each other at around the central axis of the combustion chamber, the fuel concentration in the vicinity of the central axis of the combustion chamber is increased, and oxygen becomes locally insufficient, whereby soot may be generated.

This disclosure is to curb generation of soot, by promoting mixing of fuel and air.

An example aspect of the present disclosure discloses an internal combustion engine. The internal combustion engine is configured to be operated by a compressed self-ignition. The internal combustion engine includes: a piston including a cavity; and a fuel injection valve configured to inject a fuel toward a side wall of the cavity formed in the piston, the fuel injection valve including a first injection hole, a second injection hole being paired with the first injection hole, the second injection hole being provided at a position that is offset from a line that passes a central axis of the fuel injection valve and the first injection hole when the fuel injection valve is observed from an axial direction of the fuel injection valve, the second injection hole being provided at a position different from a position provided with the first injection hole in a direction of the central axis of the fuel injection valve, the fuel injection valve being arranged such that a part of fuel injected from the first injection hole and a part of fuel injected from the second injection hole are gathered together at a position spaced from the side wall of the cavity by a predetermined distance a first needle configured to open and close the first injection hole and a second needle configured to open and close the second injection hole, the second needle configured to start operating to open the second injection hole after a predetermined time elapses from when the first needle starts operating to open the first injection hole. An example aspect of the present disclosure discloses an internal combustion engine. The internal combustion engine is configured to be operated by a compressed self-ignition, the internal combustion engine includes: a piston including a cavity; and a fuel injection valve configured to inject a fuel toward a side wall of a cavity formed in a piston of the internal combustion engine the fuel injection valve including a first injection hole, a second injection hole being paired with the first injection hole, the second injection hole being provided at a position that is offset from a line that passes a central axis of the fuel injection valve and the first injection hole when the fuel injection valve is observed from an axial direction of the fuel injection valve, the second injection hole being provided at a position different from a position provided with the first injection hole in a direction of the central axis of the fuel injection valve, the fuel injection valve being arranged such that a central axis of fuel spray injected from the first injection hole and a central axis of fuel spray injected from the second injection hole intersect at a position apart from the central axis of the fuel injection valve by a predetermined distance or more a first needle configured to open and close the first injection hole and a second needle configured to open and close the second injection hole, the second needle configured to start operating to open the second injection hole after a predetermined time elapses from when the first needle starts operating to open the first injection hole.

If the fuel is injected from the second injection hole after the fuel is injected from the first injection hole, the temperature at a distal end of a fuel spray from the first injection hole initially increases to a temperature level at which the fuel can be ignited. Then, before combustion of the fuel spray from the first injection hole expands, a fuel spray that comes later from the second injection hole is combined with the fuel spray from the first injection hole, at the rear end of the fuel spray from the first injection hole, behind the distal end, where combustion has not started, before combustion of the fuel spray from the first injection hole expands. As a result, the increase of the temperature of the fuel spray from the first injection hole is mitigated by latent heat of vaporization of the fuel injected from the second injection hole. Accordingly, the time at which combustion of the fuel injected from the first injection hole expands can be delayed. As a result, combustion expands in a condition where mixing of the fuel and air is promoted. Since the combustion is prevented from expanding in a condition where the oxygen concentration is low in a local region, soot is less likely or unlikely to be generated. The above-mentioned predetermined distance is a relatively small distance from the side wall of the cavity, and may be a distance from the side wall of the cavity, to a position at which combustion of the fuel injected from the first injection hole starts. The predetermined distance may be equal to 0, or substantially equal to 0. The predetermined time from the point in time at which the first needle starts operating, to a point in time at which the second needle starts operating, is a length of time that is set so that a fuel spray from the first injection hole and a fuel spray from the second injection hole are gathered together at the predetermined distance from the side wall of the cavity, and a length of time within which expansion of combustion of the fuel injected from the first injection hole can be suppressed. The first injection hole and the second injection hole may be formed such that the central axis of the first injection hole and the central axis of the second injection hole intersect with each other at the position spaced from the side wall of the cavity by the predetermined distance, so that a part of the fuel spray injected from the first injection hole and a part of the fuel spray injected from the second injection hole are gather together at the position spaced from the side wall of the cavity by the predetermined distance. Also the predetermined distance may be a distance from the central axial direction of the fuel injection valve to a vicinity of the side wall of the cavity.

A swirl may be generated in the cavity. When the swirl is generated in the cavity, the fuel injected from the first injection hole flows downstream in the rotating direction of the swirl. Then, the fuel injected from the second injection hole, with a delay from fuel injection from the first injection hole, travels while following the fuel injected from the first injection hole. Namely, even if the fuel injected from the first injection hole is carried by the swirl, to flow along with the swirl, the fuel injected from the second injection hole follows the fuel injected from the first injection hole, so that the fuel sprays from both the first and second injection holes can be gathered together. Further, the fuel injected from the first injection hole rides on the flow of swirl, so that mixing of the fuel with air is promoted. As a result, generation of soot can be curbed.

The first injection hole and the second injection hole may be provided with the fuel injection valve such that a ratio of an amount of fuel directed toward a top side of the piston to an amount of fuel directed toward a bottom side of the piston, after the fuel hit against the side wall of the cavity, becomes equal to a predetermined ratio.

Air is supplied from a squish area to a portion of the cavity close to the top of the piston. Namely, when a part of a fuel spray is directed toward the top of the piston, the fuel can be mixed with the air from the squish area, so that mixing of the fuel with the air can be further promoted, by the time that combustion of the fuel expands. Therefore, soot is less likely or unlikely to be generated. The predetermined ratio may be a ratio at which generation of soot can be curbed. Also, the first injection hole and the second injection hole may be formed such that the fuel whose amount is commensurate with the amount of air supplied from the squish area is directed toward the top of the piston, so that the air from the squish area is effectively utilized, and mixing of the air with the fuel is promoted.

An electronic control unit may be configured to i) perform fuel injection from the fuel injection valve such that the fuel injection is divided into fuel injection from the first injection hole and fuel injection from the second injection hole, and ii) control the second needle to start operation of the second needle such that the second injection hole opens after the predetermined time elapses from when the first needle starts operating.

Namely, the electronic control unit controls the first needle and the second needle, so that the fuel can be injected from the second injection hole, at the time when expansion of combustion of the fuel injected from the first injection hole can be suppressed. In this manner, generation of soot can be curbed. When pilot injection and main injection are performed, main injection may be divided into two steps and performed. When main injection and after injection are performed, at least one of the main injection and the after injection may be divided into two steps and performed.

According to the disclosure, mixing of the fuel with the air is promoted, so that generation of soot can be curbed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Some embodiments of the disclosure will be described in detail with reference to the drawings. It is, however, to be understood that the dimensions, materials, shapes, relative positions, etc. of constituents components described in the embodiments are not supposed to limit the scope of the disclosure to these details, unless otherwise particularly stated.

Figure 1:
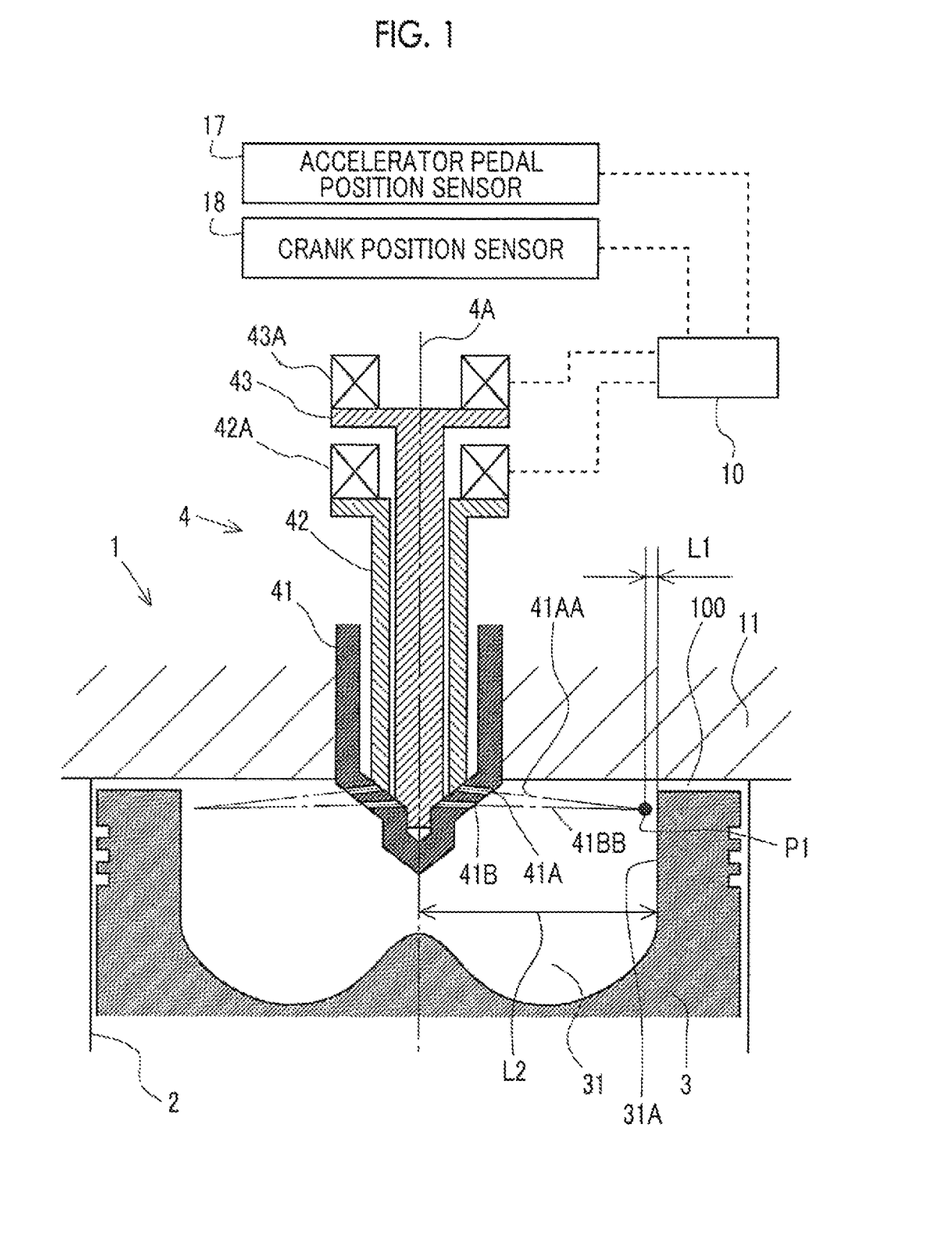
FIG. 1 is a cross-sectional view of an internal combustion engine according to one embodiment.

FIG. 1 is a cross-sectional view of an internal combustion engine 1 according to a first embodiment. A cylinder 2 of the engine 1 includes a piston 3. In this embodiment, some of constituent elements of the engine 1 are not illustrated in FIG. 1, for the sake of simplicity. The internal combustion engine 1 is a diesel engine. The engine 1 is installed on a vehicle, for example. A cavity 31 that is recessed from the top of the piston 3 toward the interior of the piston 3 is formed in the piston 3. When the piston 3 is located at around the top dead center, a squish area 100 is formed between the top of the piston 3 and a cylinder head 11.

Figure 2:
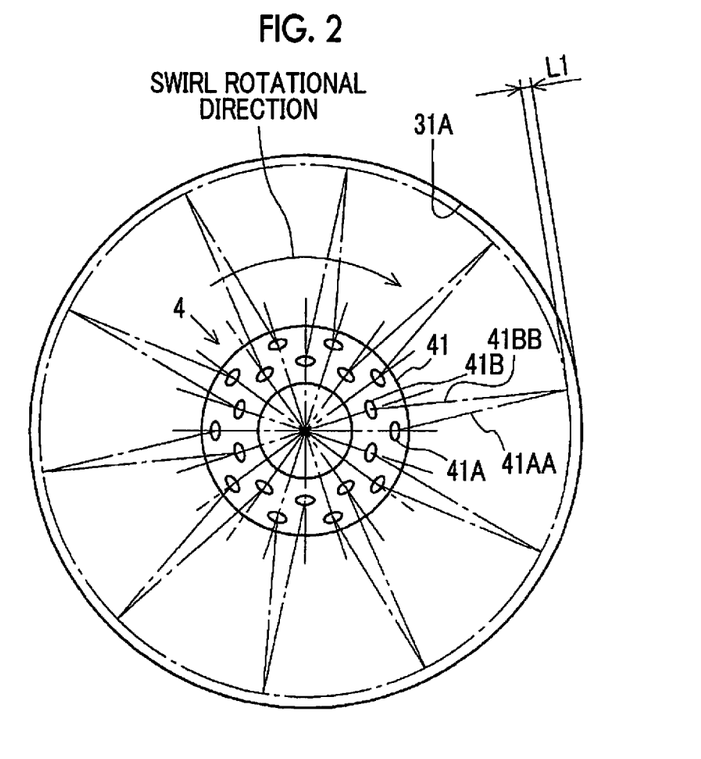
FIG. 2 is a view of a fuel injection valve as seen from a piston side.
Figure 3:
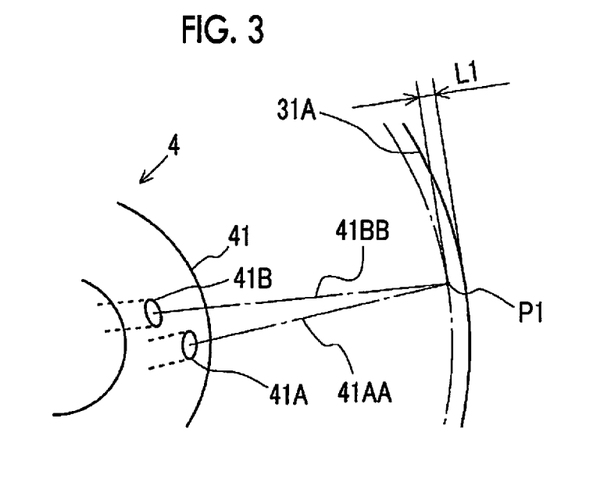
FIG. 3 is an enlarged view of a part of FIG. 2.

A fuel injection valve 4 that directly injects fuel into the cylinder 2 is provided in the cylinder head 11 of the engine 1. FIG. 2 is a view of the fuel injection valve 4 as seen from the piston 3 side. FIG. 3 is an enlarged view of a part of FIG. 2. A plurality of first injection holes 41A and a plurality of second injection holes 41B are provided equiangularly about the central axis 4A of the fuel injection valve 4, in a distal end portion of a main body 41 of the fuel injection valve 4. The second injection holes 41B are formed closer to the distal end of the fuel injection valve 4 and closer to the central axis 4A of the fuel injection valve 4 than the first injection holes 41A. Accordingly, the second injection holes 41B are provided at different positions from the first injection holes 41A as viewed in a direction of the central axis 4A of the fuel injection valve 4. The number of the first injection holes 41A is the same as the number of the second injection holes 41B, and one of the first injection holes 41A and one of the second injection holes 41B which is closest to the one first injection hole 41A are located as a pair of injection holes. The first injection hole 41A and the second injection hole 41B that form the pair of injection holes are shifted from each other by a given angle in the circumferential direction about the central axis 4A, in other words, are not aligned with each other in a radial direction of the fuel injection valve 4, as shown in FIG. 2. Accordingly, the second injection holes 41B are provided at different positions or angles in the circumferential direction about the central axis 4A of the fuel injection valve 4, from the first injection holes 41A. Thus, the first injection holes 41A and the second injection holes 41B are formed in a so-called zigzag arrangement. The cross-section of FIG. 1 is set so as to pass the central axis 4A of the fuel injection valve 4, the central axes of the first injection holes 41A, and the central axes of the second injection holes 41B.

The fuel injection valve 4 is provided with an outer needle 42 that opens and closes the first injection holes 41A, and an inner needle 43 that opens and closes the second injection holes 41B. The outer needle 42 is advanced and retracted by an outer needle valve mechanism 42A, and the inner needle 43 is advanced and retracted by an inner needle valve mechanism 43A. The outer needle valve mechanism 42A and the inner needle valve mechanism 43A include piezoelectric devices, for example, and the piezoelectric devices are respectively energized, so that the outer needle 42 and the inner needle 43 are respectively lifted. In this embodiment, the outer needle 42 corresponds to the first needle according to the disclosure, and the inner needle 43 corresponds to the second needle according to the disclosure.

The first injection holes 41A and the second injection holes 41B are formed such that a part of fuel spray injected from each of the first injection holes 41A and a part of fuel spray injected from a corresponding one of the second injection holes 41B paired with the first injection hole 41A are gathered together at a position that is spaced from a side wall 31A of the cavity 31 by a predetermined distance L1. The first injection holes 41A are formed so as to inject fuel toward the downstream side of a swirl, and the second injection holes 41B are formed so as to inject fuel toward the upstream side of the swirl. In this embodiment, the swirl rotates in the right direction, as indicated by an arrow in FIG. 2, where the fuel injection valve 4 is observed from the piston 3 side.

The predetermined distance L1 defines a range that can be said to be the vicinity of the side wall 31A. In order to gather parts of fuel sprays together at this position, the corresponding first injection hole 41A and second injection hole 41B are formed, such that the central axis 41AA of the first injection hole 41A and the central axis 41BB of the second injection hole 41B intersect with each other at point P1 (which will be called "intersection point P1") that is spaced from the side wall 31A of the cavity 31 by the predetermined distance L1.

In this embodiment, the intersection point P1 may be located on the side wall 31A, since a part of fuel spray injected from the first injection hole 41A and a part of fuel spray injected from the second injection hole 41B are only required to be gathered together in the vicinity of the side wall 31A of the cavity 31. Namely, the predetermined distance L1 may be set to 0. Also, while the central axis 41AA of the first injection hole 41A and the central axis 41BB of the second injection hole 41B intersect with each other at the intersection point P1 in this embodiment, the central axis 41AA of the first injection hole 41A and the central axis 41BB of the second injection hole 41B are not necessarily required to intersect with each other, since a part of fuel spray injected from the first injection hole 41A and a part of fuel spray injected from the second injection hole 41B are only required to be gathered together at the position spaced from the side wall 31A of the cavity 31 by the predetermined distance L1.

As shown FIG. 1, a predetermined distance L2 may be a distance from the central axial direction of the fuel injection valve to a vicinity of the side wall of the cavity. Also a central axis of fuel spray injected from the first injection hole 41A and a central axis of fuel spray injected from the second injection hole 41B may intersect at a position apart from the central axis of the fuel injection valve 4 by a predetermined distance L2 or more.

The internal combustion engine 1 constructed as described above is equipped with an ECU 10 as an electronic control unit for controlling the engine 1. The ECU 10 controls the engine 1 according to operating conditions of the engine 1 and a request(s) made by the driver. Various sensors, such as an accelerator pedal position sensor 17 that detects the engine load, and a crank position sensor 18 that detects the engine speed, are connected to the ECU 10 via electric wiring, and output signals of these sensors are transmitted to the ECU 10. The accelerator pedal position sensor 17 outputs an electric signal according to the amount of depression of the accelerator pedal by the driver.

The outer needle valve mechanism 42A and the inner needle valve mechanism 43A are connected to the ECU 10 via electric wiring, so that these mechanisms are controlled by the ECU 10. When a command signal is supplied from the ECU 10 to the outer needle valve mechanism 42A, the outer needle 42 is lifted, so that the outer needle 42 moves in such a direction as to open the first injection holes 41A. On the other hand, when the command signal stops being supplied from the ECU 10 to the outer needle valve mechanism 42A, the outer needle 42 is lowered, so that the outer needle 42 moves in such a direction as to close the first injection holes 41A. Similarly, when a command signal is supplied from the ECU 10 to the inner needle valve mechanism 43A, the inner needle 43 is lifted, so that the inner needle 43 moves in such a direction as to open the second injection holes 41B. On the other hand, when the command signal stops being supplied from the ECU 10 to the inner needle valve mechanism 43A, the inner needle 43 is lowered, so that the inner needle 43 moves in such a direction as to close the second injection holes 41B.

The ECU 10 determines the fuel injection amount, i.e., the amount of fuel injected from the fuel injection valve 4, and the fuel injection timing, based on operating conditions (such as the engine speed and the accelerator pedal stroke) of the engine 1. The relationships between the operating conditions of the engine 1, and the amount and timing of fuel injection from the first injection holes 41A and the second injection holes 41B are obtained in advance by experiment, or the like, and stored in the ECU 10 in the form of maps. The map of the fuel injection amount is set so that the air-fuel ratio in the cylinder becomes equal to a target air-fuel ratio, and the target air-fuel ratio is set according to operating conditions of the engine 1.

Figure 4:
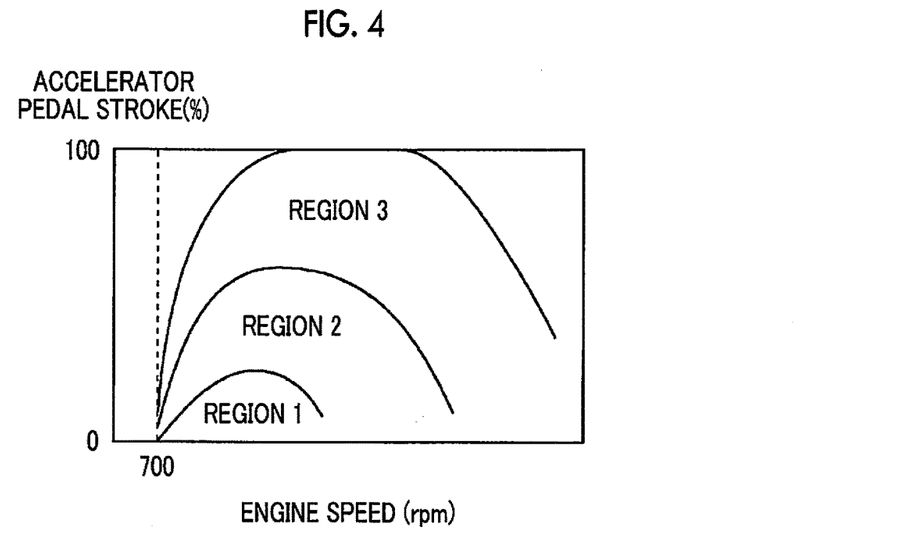
FIG. 4 is a view showing the relationship between the engine speed and the accelerator pedal stroke.

The ECU 10 performs main injection, pilot injection, and after injection, for example, according to operating conditions of the engine 1. The pilot injection is performed before the main injection, and the after injection is performed after the main injection. FIG. 4 shows the relationship between the engine speed and the accelerator pedal stroke. In FIG. 4, REGION 1 is an operating region in which the engine speed or the accelerator pedal stroke is relatively small, and pilot injection and main injection are performed in this region, for example. REGION 2 is an operating region in which the engine speed or the accelerator pedal stroke is in a middle range, and pilot injection, main injection, and after injection are performed in this region, for example. REGION 3 is an operating region in which the engine speed or the accelerator pedal stroke is relatively large, and pilot injection and main injection are performed in this region, for example.

Figure 5:
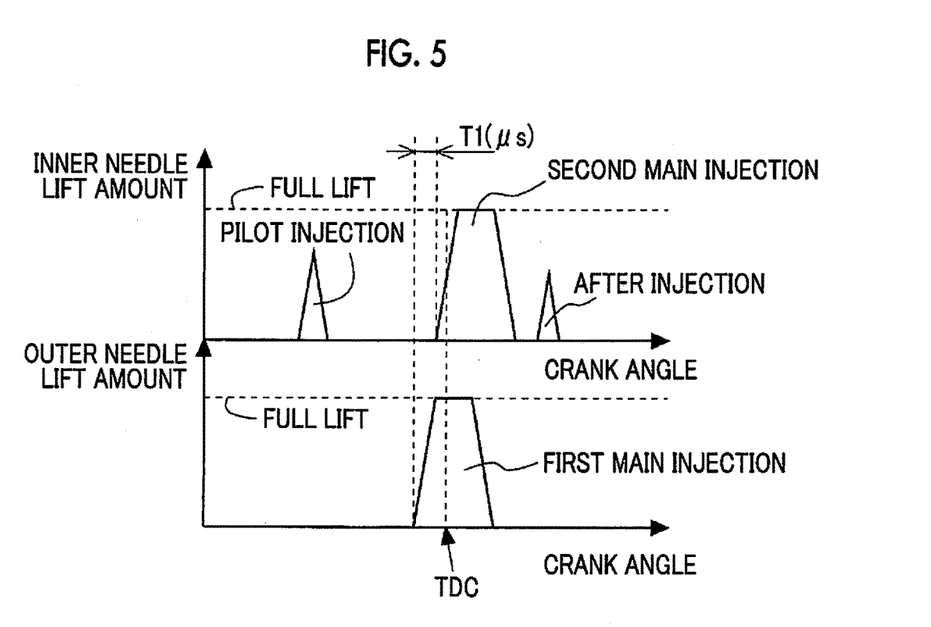
FIG. 5 is a view showing the relationships between the lift amounts of an outer needle and an inner needle, and the crank angle, according to the first embodiment.

FIG. 5 shows the relationships between the lift amounts of the outer needle 42 and the inner needle 43, and the crank angle, according to this embodiment. FIG. 5 shows the case where the pilot injection, main injection and after injection are performed in REGION 2. In FIG. 5, "FULL LIFT" means the maximum lift amount of each of the outer needle 42 and the inner needle 43. The inner needle 43 is involved in the pilot injection, main injection, and after injection, and the outer needle 42 is involved in only the main injection. Namely, the fuel is injected from both the first injection holes 41A and the second injection holes 41B in the main injection, whereas the fuel is injected only from the second injection holes 41B in the pilot injection and the after injection. In this embodiment, the lift amount of the outer needle 42 starts increasing, before a point in time at which the lift amount of the inner needle 43 starts increasing, in the main injection. In FIG. 5, T1 denotes a time difference between a point in time at which the lift amount of the inner needle 43 starts increasing and a point in time at which the lift amount of the outer needle 42 starts increasing in the main injection. The time difference T1 is not a difference in the crank angle, but is indicated as a difference in time. The time difference T1 in this embodiment corresponds to the predetermined time according to the disclosure. In the following description, the main injection from the first injection holes 41A will be referred to as "first main injection", and the main injection from the second injection holes 41B will be referred to as "second main injection".

If the main injection is performed in REGION 2 in which the temperature in the cylinder 2 is high, combustion of the fuel provided by the main injection starts at a relatively early time, and therefore, combustion of the fuel provided by the main injection can expand at a relatively early time. In this case, since the combustion expands while the fuel and air are not sufficiently mixed together, the fuel burns in a condition where oxygen is insufficient at a location where the fuel concentration is high. As a result, soot may be generated due to a local shortage of oxygen. On the other hand, in this embodiment, in order to suppress or curb expansion of combustion of the fuel provided by the main injection at a relatively early time, the first injection holes 41A and the second injection holes 41B are formed such that a part of fuel spray injected from each of the first injection holes 41A and a part of fuel spray injected from a corresponding one of the second injection holes 41B paired with the first injection hole 41A are gathered together at the position spaced from the side wall 31A of the cavity 31 by the predetermined distance L1, when the piston 3 is located at around the top dead center. Further, the time difference T1 as indicated in FIG. 5 is provided for the main injection, and the fuel injection from the first injection holes 41A and the second injection holes 41B is performed with the time difference T1. In this embodiment, a pair of injection holes are formed, such that a part of fuel spray provided by the second main injection and a part of fuel spray provided by the first main injection are gather together, before combustion of the fuel provided by the first main injection expands from a distal end portion of the fuel spray, and the fuel is injected with the time difference T1 provided, so that the temperature of the fuel spray provided by the first main injection is reduced, due to latent heat of vaporization of the fuel provided by the second main injection, at a location where the fuel sprays are gathered or combined together. Therefore, the combustion is less likely or unlikely to expand at a relatively early time. Also, the fuel spray provided by the second main injection is combined with the fuel spray provided by the first main injection while the spray is being vaporized at a location different from the location where the combustion is started; therefore, combustion of the fuel provided by the second main injection is suppressed or restricted, due to latent heat of vaporization of the fuel spray provided by the first main injection. Further, the fuel spray provided by the first main injection and the fuel spray provided by the second main injection are not gathered together, until the fuel spray provided by the first main position reaches a position at which combustion is started; therefore, both of the fuel sprays can be respectively mixed with a larger amount of air, and mixing of the fuel and the air is promoted. Also, since the fuel sprays are prevented from being gathered together, until they reach the position spaced from the side wall 31A of the cavity 31 by the predetermined distance L1, the particle size of the fuel is less likely or unlikely to be large. Thus, the length of time it takes until combustion expands can be prolonged, and mixing of the fuel provided by the first main injection and the second main injection with the air can be promoted during that time. Accordingly, combustion expands in a condition where the fuel and the air are mixed well, so that soot is less likely or unlikely to be generated.

When a swirl is generated in the cavity 31, the fuel injected from each of the first injection holes 41A flows downstream in the rotating direction of the swirl. Then, the fuel injected from the corresponding second injection hole 41B, with a delay from the fuel injection from the first injection hole 41A, travels as if it follows the fuel injected from the first injection hole 41A. Namely, even if the fuel spray from the first injection hole 41A is carried by the swirl, the fuel spray from the second injection hole 41B follows the fuel spray from the first injection hole 41A, so that the fuel sprays from both of the first and second injection holes 41A, 41B can be gathered together. Since the speed of the fuel spray in radial directions of the cavity 31 is maintained, a part of the fuel spray injected from the first injection hole 41A and a part of the fuel spray injected from the second injection hole 41B paired with the first injection hole 41A are gathered together at the position spaced from the side wall 31A of the cavity 31 by the predetermined distance L1, even if the fuel spray is carried by the swirl. Accordingly, the length of time it takes until combustion of the fuel expands can be prolonged, even if the fuel spray is carried by the swirl, so that mixing of the fuel with the air can be promoted. Also, since the fuel spray rides on flow of the swirl, mixing of the fuel with the air is promoted. In this manner, too, soot is less likely or unlikely to be generated.

Figure 6:
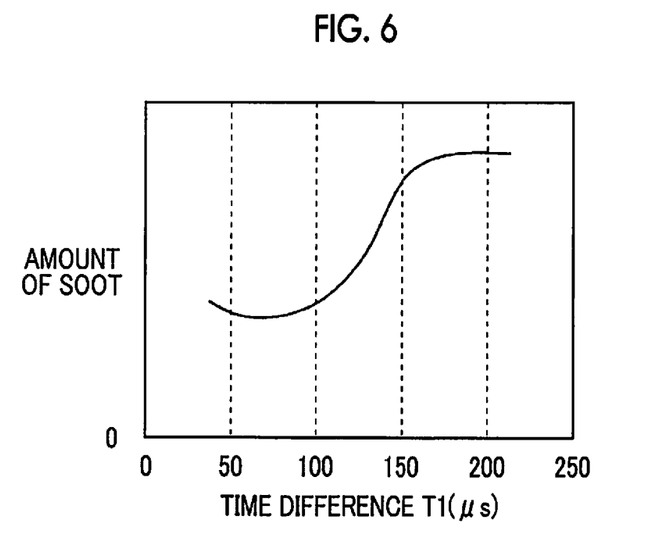
FIG. 6 is a view showing the relationship between the amount of soot generated, and a time difference.

FIG. 6 shows the relationship between the amount of soot generated and the time difference T1. For example, when the time difference T1 is equal to or smaller than 130 μs, for example, the effect of reducing soot is recognized. Accordingly, it is possible to reduce the amount of soot discharged, by setting the time difference T1 to a value equal to or smaller than 130 μs, for example. However, if the time difference T1 is too small, the amount of soot may become large, as shown in FIG. 6. Therefore, the optimum value of the time difference T1 is obtained by experiment, simulation, or the like. Here, the likelihood of burning the fuel changes depending on the operating conditions of the engine 1 and the cetane number of the fuel. Thus, in this embodiment, the time difference T1 is obtained in association with an operating condition (accelerator pedal stroke) of the engine 1 and the cetane number of the fuel.

Figure 7:
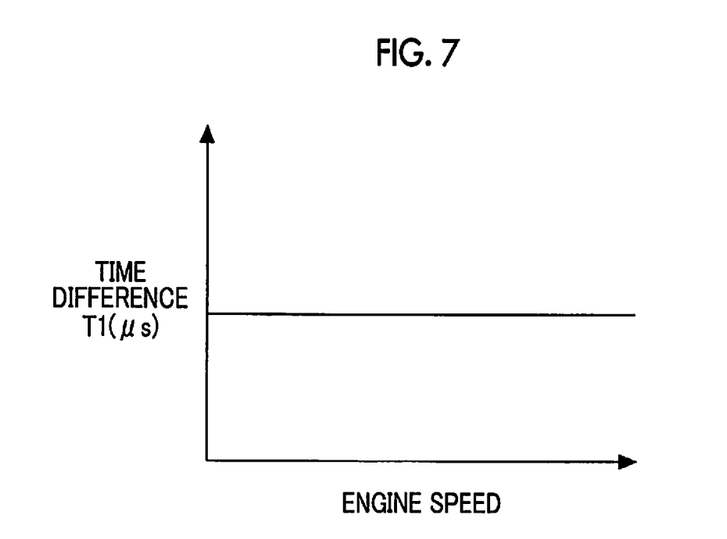
FIG. 7 is a view showing the relationship between the engine speed and the time difference.
Figure 8:
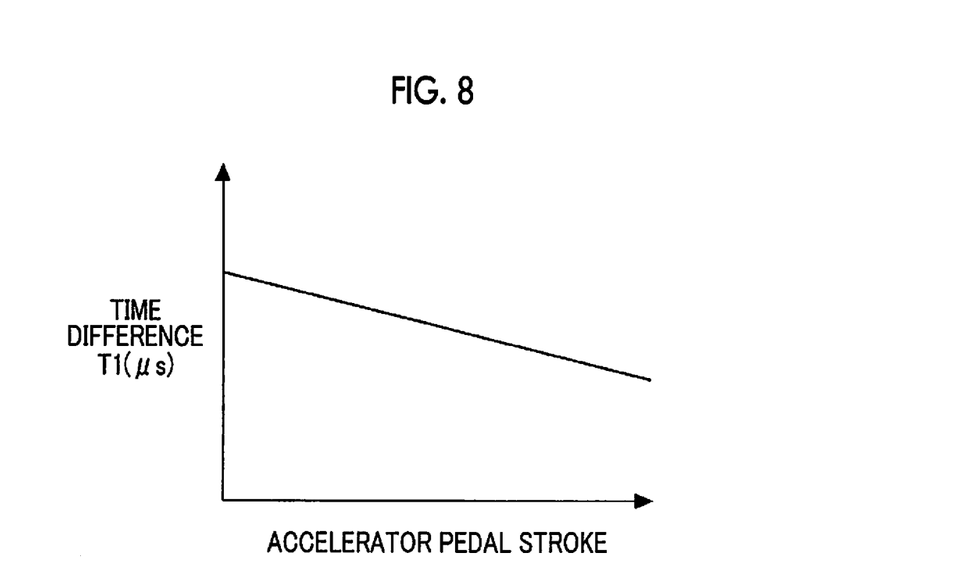
FIG. 8 is a view showing the relationship between the accelerator pedal stroke and the time difference.
Figure 9:
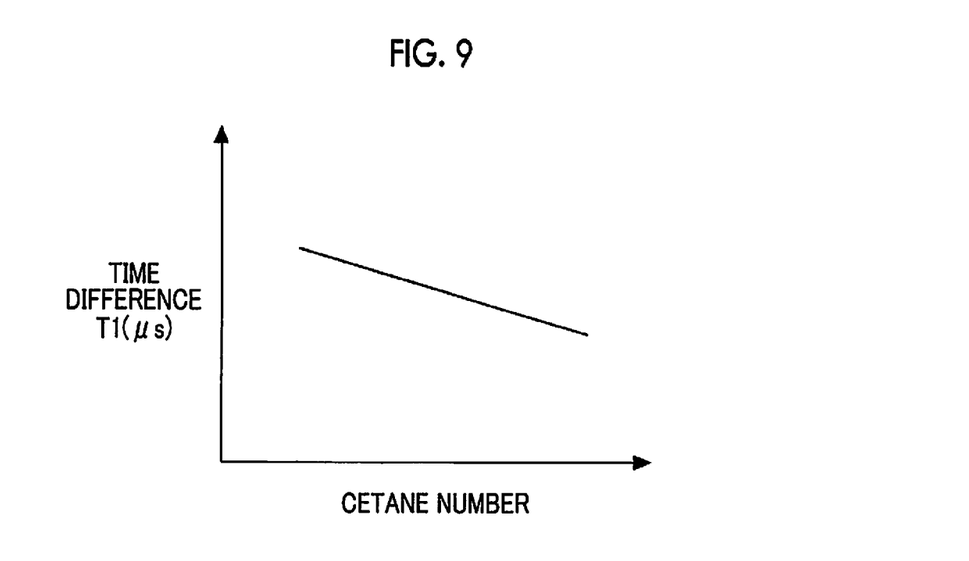
FIG. 9 is a view showing the relationship between the cetane number of fuel and the time difference.

FIG. 7 shows the relationship between the engine speed and the time difference T1. Since the likelihood of burning the fuel (the likelihood of self-ignition) hardly changes even if the engine speed changes, the time difference T1 is not changed according to the engine speed. FIG. 8 shows the relationship between the accelerator pedal stroke and the time difference T1. Since the temperature in the cylinder 2 becomes higher as the accelerator pedal stroke increases, the length of time from the main injection to the start of combustion may be shortened. Accordingly, the time difference T1 is reduced as the accelerator pedal stroke is larger. FIG. 9 shows the relationship between the cetane number of the fuel and the time difference T1. Since the fuel is more likely to be ignited as the cetane number is larger, the length of time from the main injection to the start of combustion may be shortened. Accordingly, the time difference T1 is reduced as the cetane number is larger. The relationships between the accelerator pedal stroke and the cetane number, and the time difference T1, are obtained in advance by experiment, simulation, or the like, and stored in the ECU 10. Since the cetane number is considered to be determined depending on the region, the cetane number of fuel supposed to be used for fueling in the region concerned may be set in advance.

Figure 10:
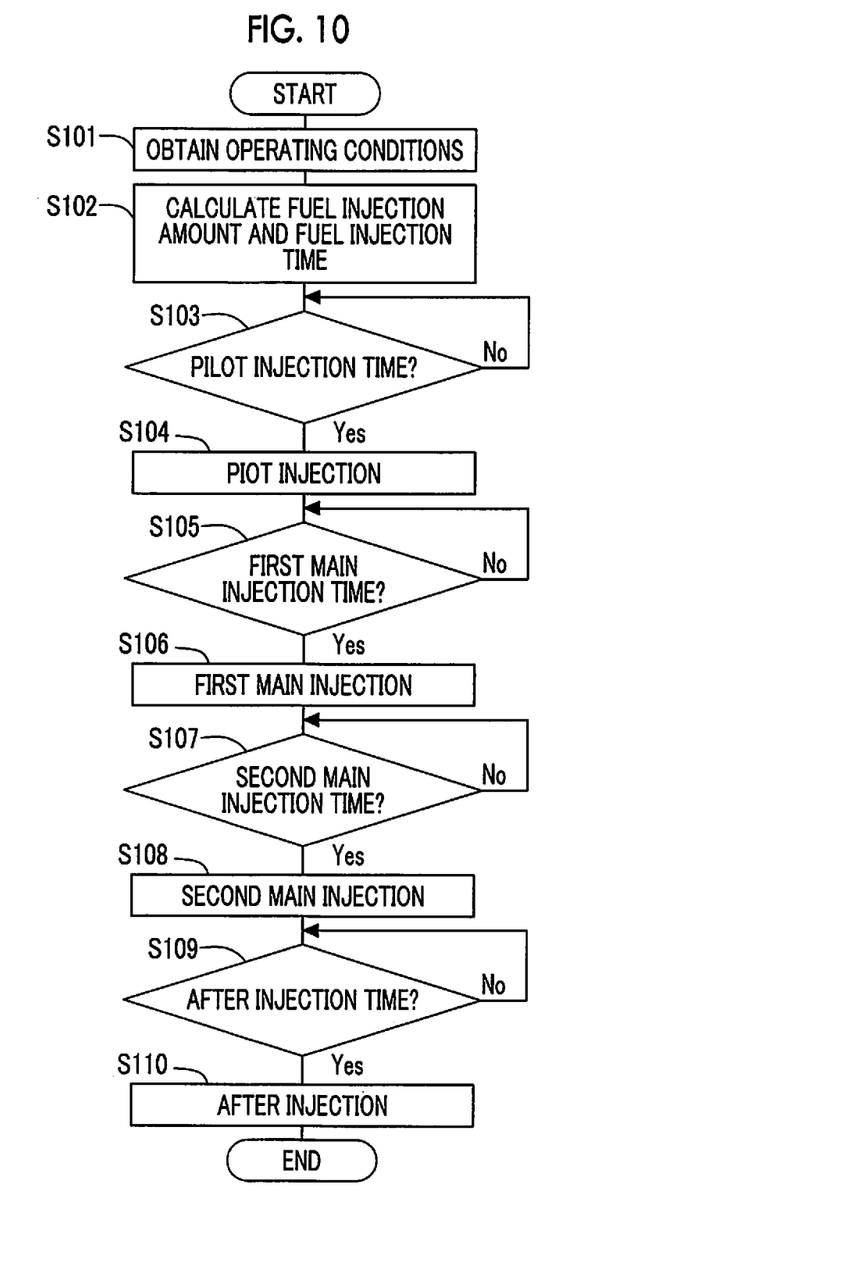
FIG. 10 is a flowchart illustrating the control flow of fuel injection according to the first embodiment.

FIG. 10 is a flowchart illustrating the control flow of fuel injection according to this embodiment. A control routine of this flowchart is executed per cycle of each cylinder 2 by the ECU 10 in REGION 2.

In step S101, the operating conditions of the internal combustion engine 1 are obtained. The ECU 10 acquires the accelerator pedal stroke obtained based on the output signal of the accelerator pedal position sensor 17, and the engine speed obtained based on the output signal of the crank position sensor 18. These operating conditions are used when the fuel injection amount and the fuel injection timing are obtained.

In step S102, on the basis of the operating conditions of the engine 1, the pilot injection amount as the fuel injection amount at the time of pilot injection, first main injection amount as the fuel injection amount at the time of the first main injection, second main injection amount as the fuel injection amount at the time of the second main injection, and the after injection amount as the fuel injection amount at the time of the after injection are calculated, and the pilot injection time as the time at which the pilot injection is started, first main injection time as the time at which the first main injection is started, and the after injection time as the time at which the after injection is started are calculated. Maps or computational expressions for obtaining the pilot injection amount, pilot injection time, first main injection amount, first main injection time, after injection amount, and the after injection time are respectively obtained in advance by experiment, simulation, or the like, and stored in the ECU 10. The second main injection time as the time at which the second main injection is started is calculated by adding the above-mentioned time difference T1 to the first main injection time. The first main injection amount and the second main injection amount may be the same amount, or may be different amounts. Also, since the maps or computational expressions differ depending on the operating region of the engine 1, maps or computational expressions corresponding to REGION 2 are used in step S102 of the routine of FIG. 10.

In step S103, it is determined whether the current time is the pilot injection time. If an affirmative decision (YES) is obtained in step S103, the control proceeds to step S104, in which the pilot injection is performed. Since the fuel is injected from the second injection holes 41B in the pilot injection, the ECU 10 sends a command signal to the inner needle valve mechanism 43A for a period of time corresponding to the pilot injection amount. On the other hand, if a negative decision (NO) is obtained in step S103, step S103 is executed again.

In step S105, it is determined whether the current time is the first main injection time. If an affirmative decision (YES) is obtained in step S105, the control proceeds to step S106, in which the first main injection is performed. Since the fuel is injected from the first injection holes 41A in the first main injection, the ECU 10 sends a command signal to the outer needle valve mechanism 42A for a period of time corresponding to the first main injection amount. On the other hand, if a negative decision (NO) is obtained in step S105, step S105 is executed again.

In step S107, it is determined whether the current time is the second main injection time. If an affirmative decision (YES) is obtained in step S107, the control proceeds to step S108, in which the second main injection is performed. Since the fuel is injected from the second injection holes 41B in the second main injection, the ECU 10 sends a command signal to the inner needle valve mechanism 43A for a period of time corresponding to the second main injection amount. On the other hand, if a negative decision (NO) is obtained in step S107, step S107 is executed again.

In step S109, it is determined whether the current time is the after injection time. If an affirmative decision (YES) is obtained in step S109, the control proceeds to step S110, in which the after injection is performed. Since the fuel is injected from the second injection holes 41B in the after injection, the ECU 10 sends a command signal to the inner needle valve mechanism 43A for a period of time corresponding to the after injection amount. On the other hand, if a negative decision (NO) is obtained in step S109, step S109 is executed again.

While the fuel is injected from the second injection holes 41B during the pilot injection in this embodiment, the fuel may be injected from the first injection holes 41A instead. Also, while the fuel is injected from the second injection holes 41B during the after injection in this embodiment, the fuel may be injected from the first injection holes 41A instead. Also, while the first main injection is performed before the second main injection in this embodiment, the order may be changed, and the second main injection may be performed before the first main injection. However, if the injection holes initially used for the main injection are different from the injection holes used for the pilot injection, as shown in FIG. 5, an influence of pulsation of the fuel which occurs during pilot injection is less likely or unlikely to be exerted during main injection; therefore, the first main injection is preferably performed before the second main injection. Also, while the control of the above embodiment is concerned with REGION 2, it may be applied to REGION 3. Namely, since the temperature in the cylinder 2 is high in REGION 3, too, combustion of the fuel provided by the main injection starts at a relatively early time if the main injection is performed. Therefore, in REGION 3, too, the main injection may be performed in two stages, as the first main injection and the second main injection, and the first main injection may be performed before the second main injection, so that generation of soot can be suppressed. Also, when the after injection is performed after the main injection, the after injection, rather than the main injection, may be performed in two stages, as injection using the first injection holes 41A and injection using the second injection holes 41B. Also, both of the main injection and the after injection may be performed in two stages, as injection using the first injection holes 41A and injection using the second injection holes 41B.

As described above, according to this embodiment, the first main injection and the second main injection are performed while being shifted in time (namely, started at different points in time), such that a part of fuel spray of the first main injection and a part of fuel spray of the second main injection are gathered together at the position spaced from the side wall 31A of the cavity 31 by the predetermined distance L1, whereby combustion is less likely or unlikely to expand early. Therefore, combustion can be expanded after the fuel and air are mixed well. As a result, generation of soot can be curbed. Also, the fuel spray is caused to ride on flow of swirl, so that mixing of the fuel with air can be further promoted, and generation of soot can be curbed.

Figure 11:
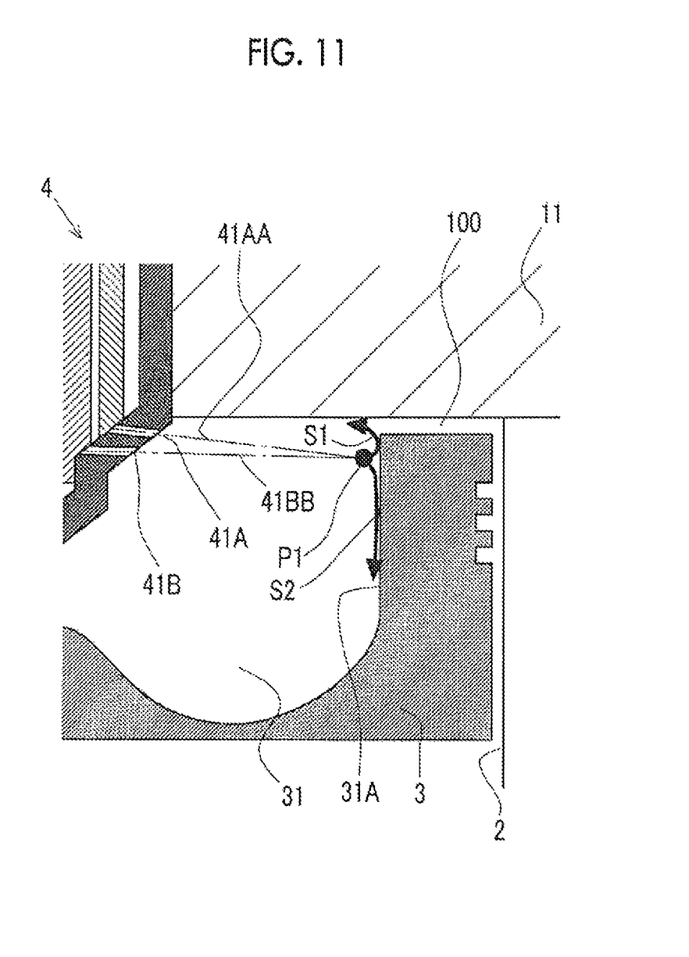
FIG. 11 is a view showing fuel spray divided at a predetermined ratio.

In a second embodiment, the first injection holes 41A and the second injection holes 41B are formed, such that the fuel injected from the corresponding first injection hole 41A and second injection hole 41B and gathered together is split at a predetermined ratio in amount, into a portion flowing toward the top of the piston 3 (namely, toward the cylinder head 11), and a portion flowing toward the bottom of the piston 3 (namely, toward the bottom of the cavity 31). FIG. 11 shows a fuel spray that is split at the predetermined ratio. In FIG. 11, S1 denotes a portion of the fuel spray which is directed toward the top of the piston 3, and S2 denotes a portion of the fuel spray which is directed toward the bottom of the piston 3. The cross-section of FIG. 11 is set so as to pass the central axis 4A of the fuel injection valve 4, the central axis 41AA of the first injection hole 41A, and the central axis 41BB of the second injection hole 41B.

When the piston 3 is located at around the top dead center, a squish area 100 is formed between the top surface of the piston 3 and the cylinder head 11. Since the volume of the squish area 100 is reduced as the piston 3 is lifted, air flow is produced from the squish area 100 toward the central axis 4A. The fuel injected from the first injection holes 41A and the second injection holes 41B is stirred by the air flow from the squish area 100, so that mixing of air and fuel is promoted. Namely, expansion of combustion is suppressed at the intersection point P1, and then, the fuel is split into the fuel spray S1 directed toward to the top of the piston 3, and the fuel spray S2 directed toward the bottom of the piston 3, before the combustion expands. Then, combustion of the fuel spray S1 directed toward the top of the piston 3 expands after mixing of the fuel and air is further promoted by air flow from the squish area 100, so that the amount of soot generated can be reduced.

On the other hand, if the amount of the fuel directed toward the top of the piston 3 is excessively large, the fuel concentration at the top side of the piston 3 becomes high, and the air may become insufficient. Accordingly, the directions of the first injection holes 41A and the second injection holes 41B are set so that the fuel is split at the predetermined ratio into a portion directed toward the top of the piston 3, and a portion directed toward the bottom of the piston 3; as a result, the fuel concentration at the top side of the piston 3 is prevented from being excessively high, and the air present on the bottom side of the cavity 31 can be effectively utilized. Therefore, combustion of the fuel spray S2 directed toward the bottom of the piston 3 also expands, after mixing of air and fuel is promoted, using the air present on the bottom side of the piston 3, so that the amount of soot generated can be reduced.

In the manner as described above, mixing of air and fuel can be further promoted, before combustion of the fuel expands; therefore, soot is less likely or unlikely to be generated. The optimum value of the above-indicated predetermined ratio can be obtained by experiment, simulation, or the like, and the predetermined ratio is, for example, 1 to 1.

What is claimed is:

1. An internal combustion engine configured to be operated by a compressed self-ignition, the internal combustion engine comprising:
   an electronic control unit;
   a piston including a cavity; and
   a fuel injection valve configured to inject a fuel toward a side wall of the cavity formed in the piston;
   the fuel injection valve including
      a first injection hole,
      a second injection hole being paired with the first injection hole, the second injection hole being provided at a position that is offset from a line that passes a central axis of the fuel injection valve and the first injection hole when the fuel injection valve is observed from an axial direction of the fuel injection valve, the second injection hole being provided at a position different from a position provided with the first injection hole in a direction of the central axis of the fuel injection valve,
      the fuel injection valve being arranged such that a part of fuel injected from the first injection hole and a part of fuel injected from the second injection hole are gathered together at a position spaced from the side wall of the cavity by a predetermined distance,
      a first needle configured to open and close the first injection hole, and
      a second needle configured to open and close the second injection hole,
   wherein the electronic control unit is configured to control operation of the first needle independently from operation of the second needle, and to control the second needle to start operating to open the second injection hole after a predetermined time elapses from when the first needle starts operating to open the first injection hole.

2. The internal combustion engine according to claim 1, wherein
   the electronic control unit is further configured to control operation of the first needle and the second needle relative to the first injection hole and the second injection hole of the fuel injection valve such that a ratio of an amount of fuel directed toward a top side of the piston to an amount of fuel directed toward a bottom side of the piston, after the fuel hits against the side wall of the cavity, becomes equal to a predetermined ratio.

3. The internal combustion engine according to claim 1, wherein the electronic control unit is further configured to
   i) perform fuel injection from the fuel injection valve such that the fuel injection is divided into fuel injection from the first injection hole and fuel injection from the second injection hole, and
   ii) control the second needle to start operation of the second needle such that the second injection hole opens after the predetermined time elapses from when the first needle starts operating.

4. An internal combustion engine configured to be operated by a compressed self-ignition, the internal combustion engine comprising:
   an electronic control unit;
   a piston including a cavity; and a fuel injection valve configured to inject a fuel toward a side wall of the cavity formed in the piston of the internal combustion engine,
the fuel injection valve including
a first injection hole,
a second injection hole being paired with the first injection hole, the second injection hole being provided at a position that is offset from a line that passes a central axis of the fuel injection valve and the first injection hole when the fuel injection valve is observed from an axial direction of the fuel injection valve,
the second injection hole being provided at a position different from a position provided with the first injection hole in a direction of the central axis of the fuel injection valve,
the fuel injection valve being arranged such that a central axis of fuel spray injected from the first injection hole and a central axis of fuel spray injected from the second injection hole intersect at a position apart from the central axis of the fuel injection valve by a predetermined distance or more,
a first needle configured to open and close the first injection hole, and
a second needle configured to open and close the second injection hole,
wherein the electronic control unit is configured to control operation of the first needle independently from operation of the second needle, and to control the second needle to start operating to open the second injection hole after a predetermined time elapses from when the first needle starts operating to open the first injection hole.

* * * * *